(12) United States Patent
Liu

(10) Patent No.: US 9,360,979 B2
(45) Date of Patent: Jun. 7, 2016

(54) CAPACITIVE BUILT-IN TOUCH SCREEN HAVING AN ARRAY SUBSTRATE ON WHICH A TRANSISTOR PANEL IS ARRANGED, ITS TOUCH POSITIONING METHOD AND DISPLAY DEVICE

(71) Applicants: BOE TECHNOLOGY GROUP CO., LTD., Beijing (CN); BEIJING BOE DISPLAY TECHNOLOGY CO., LTD., Beijing (CN)

(72) Inventor: Dong Liu, Beijing (CN)

(73) Assignees: BOE TECHNOLOGY GROUP CO., LTD. (CN); BEIJING BOE DISPLAY TECHNOLOGY CO., LTD. (CN)

( * ) Notice: Subject to any disclaimer, the term of this patent is extended or adjusted under 35 U.S.C. 154(b) by 14 days.

(21) Appl. No.: 14/489,559

(22) Filed: Sep. 18, 2014

(65) Prior Publication Data

US 2015/0378471 A1 Dec. 31, 2015

(30) Foreign Application Priority Data

Jun. 30, 2014 (CN) .......................... 2014 1 0307524

(51) Int. Cl.
*G06F 3/044* (2006.01)
(52) U.S. Cl.
CPC ...................................... *G06F 3/044* (2013.01)

(58) Field of Classification Search
CPC ...................... G06F 2203/04111; G06F 3/044
USPC .......................................... 345/156, 173–178
See application file for complete search history.

(56) References Cited

U.S. PATENT DOCUMENTS

| 2005/0162363 A1* | 7/2005 | Kim ..................... G09G 3/3614 345/92 |
| 2011/0096023 A1* | 4/2011 | Shih ..................... G06F 3/0412 345/174 |
| 2011/0193798 A1* | 8/2011 | Zhan ..................... G06F 3/044 345/173 |
| 2012/0032917 A1* | 2/2012 | Yamaguchi ........... G06F 3/0416 345/174 |

* cited by examiner

*Primary Examiner* — Ram Mistry
(74) *Attorney, Agent, or Firm* — Baker Hostetler LLP

(57) ABSTRACT

The present disclosure provides a capacitive built-in touch screen, its touch positioning method, and a display device. In the capacitive built-in touch screen, at least one of the gate lines is set as a touch scanning line, and the capacitive built-in touch screen further includes at least one touch sensing line arranged on the array substrate. The touch scanning line intersects the touch sensing line in different planes. The touch sensing line is configured to, when a scanning signal is applied to the touch scanning line, couple the scanning signal through a touch sensing capacitor to obtain and output a touch sensing signal. The touch sensing capacitor is arranged at an intersection of the touch scanning line and the touch sensing lines on different planes.

17 Claims, 2 Drawing Sheets

CAPACITIVE BUILT-IN TOUCH SCREEN HAVING AN ARRAY SUBSTRATE ON WHICH A TRANSISTOR PANEL IS ARRANGED, ITS TOUCH POSITIONING METHOD AND DISPLAY DEVICE

CROSS-REFERENCE TO RELATED APPLICATION

The present disclosure claims a priority of the Chinese patent application No. 201410307524.5 filed on Jun. 30, 2014, which is incorporated herein by reference in its entirety.

TECHNICAL FIELD

The present disclosure relates to the field of liquid crystal display, in particular to a capacitive built-in touch screen, its touching positioning method and a display device.

BACKGROUND

Along with the rapid development of display technologies, capacitive built-in touch screens have been gradually used in people's daily life. An existing capacitive built-in touch screen includes an additional touch sensor directly arranged on an existing array substrate. Usually, the touch sensor uses two bar-like electrodes, which intersect each other in different planes, as a touch scanning line and a touch sensing line, respectively, and a touch sensing capacitor is formed at an intersection of the two electrodes, which however will result in a complex process and a low aperture ratio. A touch scanning signal is applied via the touch scanning line, and a touch sensing signal sensed by the touch sensing line through the touch sensing capacitor is detected. During this procedure, if a human body contacts the touch screen, an electric field of the human body will be applied to the touch sensing capacitor so as to change the capacitance value of the touch sensing capacitor, thereby to change the touch sensing signal detected by the touch sensing line. As a result, it is able to determine a position of a touch point in accordance with the change of the touch sensing signal.

Another existing capacitive built-in touch screen includes gate lines or data lines arranged on the array substrate as the touch scanning line and the touch sensing line. However, the gate line and the data line are also used for a display function, so it is required to achieve the display function and a touch function within different time periods. As a result, a charge time for pixels or a display refresh rate will be reduced.

SUMMARY

A main object of the present disclosure is to provide a capacitive built-in touch screen, its touch positioning method, and a display device, so as to achieve a display function and a touch function within an identical time period while improving an aperture ratio of an array substrate.

In one aspect, the present disclosure provides a capacitive built-in touch screen, including an array substrate and a color film substrate arranged oppositely to form a cell. A plurality of gate lines, a plurality of data lines, and a plurality of pixel units defined by two adjacent gate lines and two adjacent data lines are arranged on the array substrate. At least one of the gate lines is set as a touch scanning line.

The capacitive built-in touch screen further includes at least one touch sensing line arranged on the array substrate. The touch scanning line intersects the touch sensing line in different planes. The touch sensing line is configured to, when a scanning signal is applied to the touch scanning line, couple the scanning signal through a touch sensing capacitor to obtain and output a touch sensing signal. The touch sensing capacitor is arranged at an intersection of the touch scanning line and the touch sensing lines on different planes.

During the implementation, a transparent metal layer on the color film substrate corresponding to a position where the touch sensing capacitor is located is provided with an opening.

During the implementation, the touch sensing line is arranged between adjacent columns of the pixel units.

During the implementation, the capacitive built-in touch screen further includes a touch sensing module connected to the touch sensing line, and configured to receive the touch sensing signal from the touch sensing line, determine whether a touch operation exists or not in accordance with the presence or absence of a change of the touch sensing signal, and when the touch operation exists, detect the change of touch sensing signal so as to obtain touch position information.

During the implementation, the array substrate is further provided with a plurality of common electrode lines, which are arranged between adjacent rows of the pixel units. The capacitive built-in touch screen further comprises a common electrode signal inputting module connected to the plurality of common electrode lines and configured to input common electrode voltage signals to the plurality of common electrode lines.

During the implementation, the array substrate is further provided with a plurality of common electrode lines, which are arranged between adjacent rows of the pixel units. The capacitive built-in touch screen further includes a common electrode signal inputting module connected to the plurality of common electrode lines and configured to input common electrode voltage signals thereinto.

The capacitive built-in touch screen further includes a touch sensing module, a common electrode signal compensating module, at least one input TFT and at least one two-way switch. A gate electrode of the input TFT is connected to a row of the touch scanning line, a source electrode thereof is connected to a column of the touch sensing line, and a gate electrode thereof is connected to a row of the common electrode line. The input TFT includes an input first TFT and a second input TFT. A gate electrode of the first input TFT and a gate electrode of the second input TFT are connected to the touch scanning lines in different rows. A source electrode of the first input TFT and a source electrode of the second input TFT are connected to the touch sensing lines in different columns. A drain electrode of the first input TFT and a drain electrode of the second input TFT are connected to the common electrode lines in different rows.

A first input end of the two-way switch is connected to the touch sensing module, a second input end thereof is connected to the common electrode signal compensating module, and an output end thereof is connected to the touch sensing line. The two-way switch is configured to, when a scanning signal is applied to the row of touch scanning line connected to the gate electrode of the first input TFT, enable the touch sensing module to be in electrical connection with the column of the touch sensing line not connected to the source electrode of the first input TFT, and enable the common electrode signal compensating module to be in electrical connection with the column of the touch sensing line connected to the source electrode of the first input TFT.

The two-way switch is further configured to, when a scanning signal is applied to the row of the touch scanning line connected to the gate electrode of the second input TFT, enable the touch sensing module to be in electrical connection with the column of the touch sensing lines not connected to the source electrode of the second input TFT, and enable the common electrode signal compensating module to be in electrical connection with the column of the touch sensing lines connected to the source electrode of the second input TFT.

The touch sensing module is configured to, when the touch sensing module is in electrical connection with the touch sensing line through the two-way switch, receive the touch sensing signal from the touch sensing line, determine whether the touch operation exists or not in accordance with the presence or absence of the change of the touch sensing signal, and when the touch operation exists, detect the change of touch sensing signal so as to obtain the touch position information.

The common electrode signal compensating module is configured to, when the common electrode signal compensating module is in electrical connection with the touch sensing line through the two-way switch, transmit a common electrode voltage compensating signal to the common electrode line, which is connected to the common electrode signal compensating module via the input TFT, through the touch sensing lines, so as to compensate a change of the common electrode voltage signal on the common electrode line.

During the implementation, the gate electrode of the first input TFT is connected to the touch scanning lines in odd rows, the source electrode thereof is connected to the touch sensing lines in even columns, and the drain electrode thereof is connected to the common electrode lines in even rows.

The gate electrode of the second input TFT is connected to the touch scanning lines in even rows, the source electrode thereof is connected to the touch sensing lines in odd columns, and the drain electrode thereof is connected to the common electrode lines in odd rows.

The two-way switch is configured to, when the scanning signal is applied to the touch scanning lines in odd rows, enable the touch sensing module to be in electrical connection with the touch sensing lines in odd columns and enable the common electrode signal compensating module to be in electrical connection with the touch sensing lines in even columns, and when the scanning signal is applied to the touch scanning lines in even rows, enable the touch sensing module to be in electrical connection with the touch sensing lines in even columns, and enable the common electrode signal compensating module to be in electrical connection with the touch sensing lines in odd columns.

During the implementation, the gate electrode of the first input TFT is connected to the touch scanning lines in odd rows, the source electrode thereof is connected to the touch sensing lines in odd columns, and the drain electrode thereof is connected to the common electrode lines in even rows.

The gate electrode of the second input TFT is connected to the touch scanning lines in even rows, the source electrode thereof is connected to the touch sensing lines in even columns, and the drain electrode thereof is connected to the common electrode lines in odd rows.

The two-way switch is configured to, when the touch scanning lines in odd rows are scanned, enable the touch sensing module to be in electrical connection with the touch sensing lines in even columns, and enable the common electrode signal compensating module to be in electrical connection with the touch sensing lines in odd columns, and when the touch scanning lines in even rows are scanned, enable the touch sensing module to be in electrical connection with the touch sensing lines in odd columns, and enable the common electrode signal compensating module to be in electrical connection with the touch sensing lines in even columns.

In another aspect, the present disclosure provides a touch positioning method for use in the above-mentioned capacitive built-in touch screen, including: when a scanning signal is applied to a touch scanning line, detecting a touch sensing signal coupled by a touch sensing line through a touch sensing capacitor, and determining touch position information in accordance with a change of the touch sensing signal and a position of the touch sensing capacitor.

In yet another aspect, the present disclosure provides a display device including the above-mentioned capacitive built-in touch screen.

As compared with the prior art, according to the capacitive built-in touch screen, its touch positioning method and the display device of the present disclosure, at least one gate line on the array substrate is used as the touch scanning line, and at least one touch sensing line intersecting the touch scanning line in different planes are arranged on the array substrate. When the gate lines are scanned (i.e., when the scanning signal is applied to the touch scanning lines), a data signal is inputted via a data line, and meanwhile the gate scanning signals are coupled by the scanning sensing line through the touch sensing capacitor, so as to obtain and output the touch sensing signal. As a result, it is able to achieve the display function and the touch function within an identical period of time while improving an aperture ratio of the array substrate, without affecting a charge time for the pixels or reducing a display refresh rate. In addition, it is able to stabilize a voltage of a common electrode network by inputting the common electrode voltage compensating signal while achieving the touch function, and improve its stability and uniformity, thereby to improve the display quality.

DETAILED DESCRIPTION

The present disclosure will be described hereinafter in a clear and complete manner in conjunction with the drawings. Obviously, the followings are merely a part of, rather than all of, the embodiments of the present disclosure. Based on the following embodiments, a person skilled in the art can obtain the other embodiments without any creative effort, and these embodiments shall also fall within the scope of the present disclosure.

Figure 1:
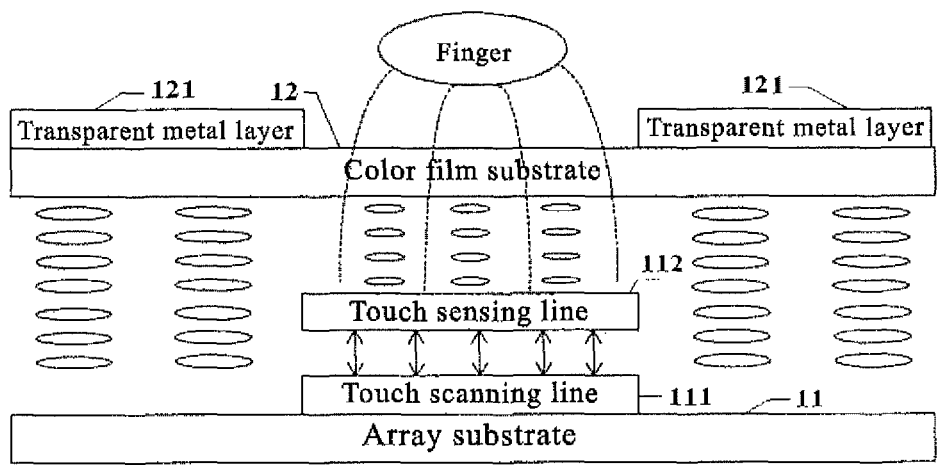
FIG. 1 is a schematic view showing a structure of a capacitive built-in touch screen according to one embodiment of the present disclosure.

As shown in FIG. 1, a capacitive built-in touch screen includes an array substrate 11 and a color film substrate 12 arranged oppositely to form a cell. A liquid crystal layer is arranged between the array substrate 11 and the color film substrate 12. On the array substrate 11 is provided with a plurality of gate lines, a plurality of data lines, and a plurality of pixel units defined by two adjacent gate lines and two adjacent data lines. At least one of the gate lines is set as a touch scanning line 111. The capacitive built-in touch screen further includes at least one touch sensing line 112 arranged on the array substrate. The touch scanning line 111 intersects the touch sensing line 112 in different planes. The touch sensing line 112 is configured to, when a scanning signal is applied to the touch scanning line 111, couple the scanning signal through a touch sensing capacitor to obtain and output a touch sensing signal. The touch sensing capacitor is formed at an intersection (not shown) between the touch scanning line 111 and the touch sensing line 112 on different planes.

According to the capacitive built-in touch screen of the present disclosure, at least one gate line on the array substrate is used as the touch scanning line, and at least one touch sensing line intersecting the touch scanning line in different planes are arranged on the array substrate. When the gate lines are scanned (i.e., when the scanning signals are applied to the touch scanning line), a data signal is inputted via a data line, and meanwhile the gate scanning signals are coupled by the touch sensing line through the touch sensing capacitor, so as to obtain and output the touch sensing signal. As a result, it is able to achieve the display function and the touch function within an identical period of time while improving an aperture ratio of the array substrate, without affecting a charge time for the pixels or reducing a display refresh rate.

Alternatively, a transparent metal layer 121 is formed on the color film substrate 12, and an opening is provided on the transparent meal layer 121 of the color film substrate 12 at a position corresponding to the touch sensing capacitor, so that the capacitive built-in touch screen can perform the touch positioning in a more sensitive manner.

Figure 2A:
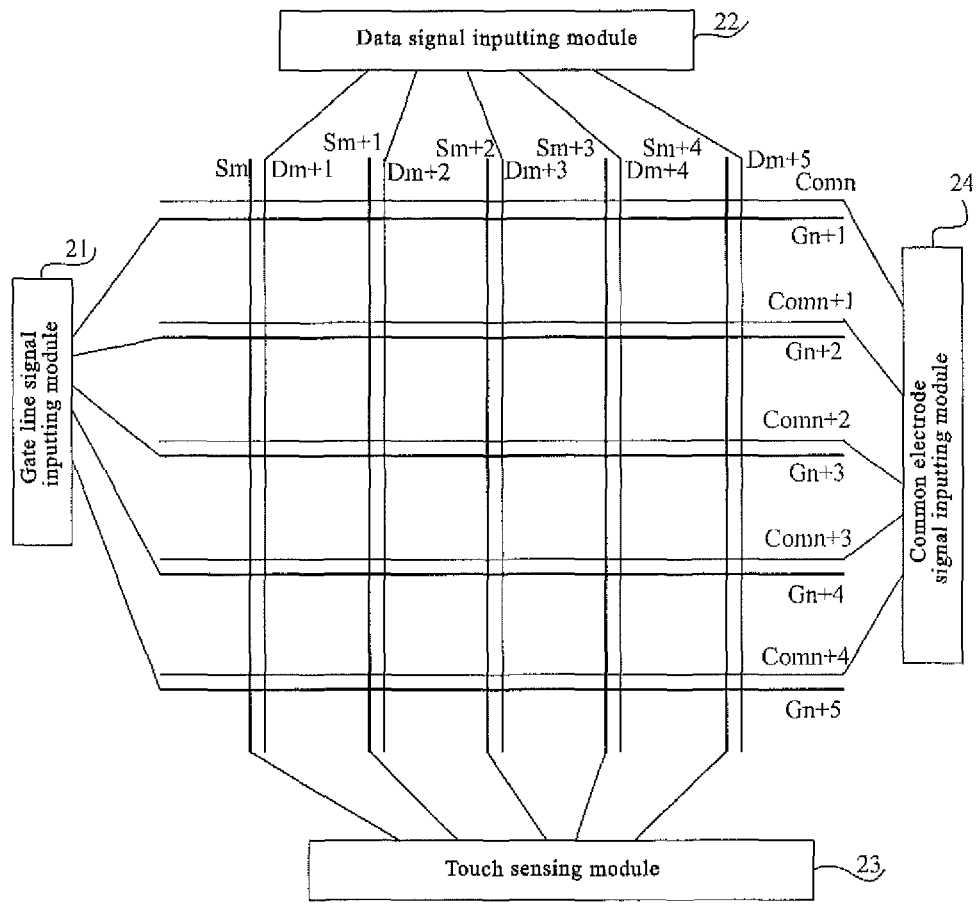
FIG. 2A is a schematic view showing a structure of an array substrate of the capacitive built-in touch screen according to one embodiment of the present disclosure.

To be specific, as shown in FIG. 2A, the capacitive built-in touch screen includes the array substrate and the color film substrate (not shown) arranged oppositely to form a cell. On the array substrate is provided with a plurality of gate lines, a plurality of data lines, a plurality of pixel electrodes, a plurality of TFTs (not shown in FIG. 2A), and a plurality of pixel units (not shown in FIG. 2A) defined by two adjacent gate lines and two adjacent data lines.

The plurality of gate lines are set as the touch scanning lines, i.e., a touch scanning line Gn+1 in the $(n+1)^{th}$ row, a touch scanning line Gn+2 in the $(n+2)^{th}$ row, a touch scanning line Gn+3 in the $(n+3)^{th}$ row, a touch scanning line Gn+4 in the $(n+4)^{th}$ row, and a touch scanning line Gn+5 in the $(n+5)^{th}$ row. The plurality of data lines includes a data line Dm+1 in the $(m+1)^{th}$ column, a data line Dm+2 in the $(m+2)^{th}$ column, a data line Dm+3 in the $(m+3)^{th}$ column, a data line Dm+4 in the $(m+4)^{th}$ column, and a data line Dm+5 in the $(m+5)^{th}$ column. M and n are both positive integers.

The capacitive built-in touch screen further includes at least one touch sensing line arranged on the array substrate and between adjacent columns of the pixel units.

The at least one touch sensing line includes a touch sensing line Sm in the $m^{th}$ column, a touch sensing line Sm+1 in the $(m+1)^{th}$ column, a touch sensing line Sm+2 in the $(m+2)^{th}$ column, a touch sensing line Sm+3 in the $(m+3)^{th}$ column, and a touch sensing line Sm+4 in the $(m+4)^{th}$ column.

The touch scanning line intersects the touch sensing line in different planes. The touch sensing line is configured to, when the scanning signals are applied to the touch scanning line, couple the gate scanning signals through the touch sensing capacitor, so as to obtain and output the touch sensing signal.

A plurality of common electrode lines are further arranged on the array substrate and between adjacent rows of the pixel units.

The plurality of common electrode lines include a common electrode line Comn in the $n^{th}$ row, a common electrode line Comn+1 in the $(n+1)^{th}$ row, a common electrode line Comn+2 in the $(n+2)^{th}$ row, a common electrode line Comn+3 in the $(n+3)^{th}$ row, and a common electrode line Comn+4 in the $(n+4)^{th}$ row.

The capacitive built-in touch screen further includes a gate line signal inputting module 21 connected to the touch scanning line Gn+1 in the $(n+1)^{th}$ row, the touch scanning line Gn+2 in the $(n+2)^{th}$ row, the touch scanning line Gn+3 in the $(n+3)^{th}$ row, the touch scanning line Gn+4 in the $(n+4)^{th}$ row and the touch scanning line Gn+5 in the $(n+5)^{th}$ row, respectively, and configured to input the scanning signals to the touch scanning line Gn+1 in the $(n+1)^{th}$ row, the touch scanning line Gn+2 in the $(n+2)^{th}$ touch scanning line Gn+3 in the $(n+3)^{th}$ row, the touch scanning line Gn+4 in the $(n+4)^{th}$ row and the touch scanning line Gn+5 in the $(n+5)^{th}$ row in turn.

The capacitive built-in touch screen further includes a data signal inputting module 22 connected to the data line Dm+1 in the $(m+1)^{th}$ column, the data line Dm+2 in the $(m+2)^{th}$ column, the data line Dm+3 in the $(m+3)^{th}$ column, the data line Dm+4 in the $(m+4)^{th}$ column and the data line Dm+5 in the $(m+5)^{th}$ column, respectively, and configured to input the data signals to the data line Dm+1 in the $(m+1)^{th}$ column, the data line Dm+2 in the $(m+2)^{th}$ column, the data line Dm+3 in the $(m+3)^{th}$ column, the data line Dm+4 in the $(m+4)^{th}$ column and the data line Dm+5 in the $(m+5)^{th}$ column.

The capacitive built-in touch screen further includes a touch sensing module 23 connected to the touch sensing line Sm in the $m^{th}$ column, the touch sensing line Sm+1 in the $(m+1)^{th}$ column, the touch sensing line Sm+2 in the $(m+2)^{th}$ column, the touch sensing line Sm+3 in the $(m+3)^{th}$ column, and the touch sensing line Sm+4 in the $(m+4)^{th}$ column, respectively, and configured to receive the touch sensing signals from the touch sensing line Sm in the $m^{th}$ column, the touch sensing line Sm+1 in the $(m+1)^{th}$ column, the touch sensing line Sm+2 in the $(m+2)^{th}$ column, the touch sensing line Sm+3 in the $(m+3)^{th}$ column, and the touch sensing line Sm+4 in the $(m+4)^{th}$ column, determine whether a touch operation exists or not in accordance with the presence or absence of a change of the touch sensing signals, and when the touch operation exists, detect the change of the touch sensing signals, so as to obtain the touch position information.

The capacitive built-in touch screen further includes a common electrode signal inputting module 24 connected to the common electrode line Comn in the $n^{th}$ row, the common electrode line Comn+1 in the $(n+1)^{th}$ row, the common electrode line Comn+2 in the $(n+2)^{th}$ row, the common electrode line Comn+3 in the $(n+3)^{th}$ row, and the common electrode line Comn+4 in the $(n+4)^{th}$ row, respectively, and configured to input common electrode voltage signals to v the common electrode line Comn in the $n^{th}$ row, the common electrode line Comn+1 in the $(n+1)^{th}$ row, the common electrode line Comn+2 in the $(n+2)^{th}$ row, the common electrode line Comn+3 in the $(n+3)^{th}$ row, and the common electrode line Comn+4 in the $(n+4)^{th}$ row.

Figure 2B:
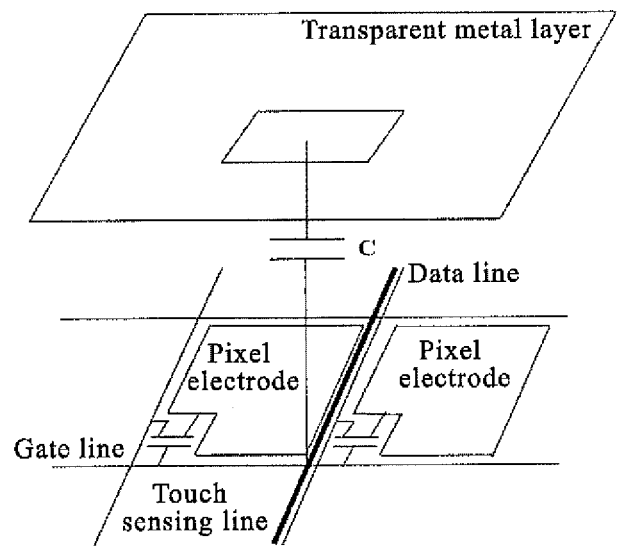
FIG. 2B is a schematic view showing a touch sensing capacitor formed at an intersection of a gate line and a touch sensing line in different planes on the array substrate of the capacitive built-in touch screen according to one embodiment of the present disclosure.

As shown in FIG. 2B, a gate electrode of the TFT is connected to the gate line, a source electrode thereof is connected to the data line, and a drain electrode thereof is connected to the pixel electrode. When the gate line is scanned (i.e., when the scanning signal is applied to the touch scanning line), the TFT connected to the gate line is turned on, and the data signal is inputted via the data line.

The touch sensing capacitor C is formed at the intersection between the touch scanning line and the touch sensing line on different planes, and the opening is provided on the transparent metal layer of the color film substrate at a position corresponding to the touch sensing capacitor C.

Alternatively, among the touch scanning line, the touch sensing line and the common electrode line is formed an input TFT, a gate electrode of the input TFT is connected to the touch scanning line, a source electrode thereof is connected to the touch sensing line, and a drain electrode thereof is connected to the common electrode line.

The capacitive built-in touch screen further includes a two-way switch and a common electrode signal compensating module.

A first input end of the two-way switch is connected to the touch sensing module, a second input end thereof is connected to the common electrode signal compensating module, and an output end thereof is connected to the touch sensing line.

The input TFTs are arranged uniformly in alternate columns/rows in both a direction of the touch scanning line and in a direction of the touch sensing line. As a result, when the scanning signal is applied to a row of the touch scanning line, the touch sensing line connected to the row of touch scanning line through the input TFT inputs the common electrode voltage compensating signal from the common electrode signal compensating module into the common electrode line connected to the common electrode signal compensating module through the input TFT, so as to compensate a change of the common electrode voltage signal on the common electrode line. The touch sensing line not connected to the row of touch scanning line through the input TFT is connected to the touch sensing module, and the touch sensing module receives the touch sensing signal from the touch sensing line, determines whether the touch operation exists or not in accordance with the change of the touch sensing signal, and when the touch operation exists, detects the change of the touch sensing signal, so as to obtain the touch position information.

In this way, it is able to improve the stability of a voltage of a common electrode network while performing the data signal input and the touch control, thereby to improve the display quality.

To be specific, the capacitive built-in touch screen further includes the touch sensing module, the common electrode signal compensating module, at least one input TFT, and at least one two-way switch. The gate electrode of the input TFT is connected to a row of the touch scanning line, the source electrode thereof is connected to a column of the touch sensing line, and the drain electrode thereof is connected to a row of the common electrode line.

The input TFT includes a first input TFT and a second input TFT. A gate electrode of the first input TFT and a gate electrode of the second input TFT are connected to the touch scanning lines in different rows. A source electrode of the first input TFT and a source electrode of the second input TFT are connected to the touch sensing lines in different columns. A drain electrode of the first input TFT and a drain electrode of the second input TFT are connected to the common electrode lines in different rows.

The first input end of the two-way switch is connected to the touch sensing module, the second input end thereof is connected to the common electrode signal compensating module, and the output end thereof is connected to the touch sensing line. The two-way switch is configured to, when the scanning signal is applied to the row of touch scanning lines connected to the gate electrode of the first input TFT, enable the touch sensing module to be in electrical connection with the column of the touch sensing lines not connected to the source electrode of the first input TFT, and enable the common electrode signal compensating module to be in electrical connection with the column of the touch sensing lines connected to the source electrode of the first input TFT.

The two-way switch is further configured to, when the scanning signal is applied to the row of the touch scanning lines connected to the gate electrode of the second input TFT, enable the touch sensing module to be in electrical connection with the column of the touch sensing lines not connected to the source electrode of the second input TFT, and enable the common electrode signal compensating module to be in electrical connection with the column of the touch sensing lines connected to the source electrode of the second input TFT.

The touch sensing module is configured to, when the touch sensing module is in electrical connection with the touch sensing lines through the two-way switch, receive the touch sensing signal from the touch sensing line, determine whether the touch operation exists or not in accordance with the presence or absence of the change of the touch sensing signal, and when the touch operation exists, detect the change of touch sensing signal so as to obtain the touch position information.

The common electrode signal compensating module is configured to, when the common electrode signal compensating module is in electrical connection with touch sensing lines through the two-way switch, transmit the common electrode voltage compensating signal to the common electrode lines, which are connected to the common electrode signal compensating module via the TFT, through the touch sensing lines, so as to compensate the change of the common electrode voltage signal on the common electrode lines.

To be specific, the capacitive built-in touch screen further includes the touch sensing module, the common electrode signal compensating module, at least one input TFT, and at least one two-way switch.

The input TFT includes the first input TFT and the second input TFT. The gate electrode of the first input TFT is connected to the touch scanning lines in odd rows, the source electrode thereof is connected to the touch sensing lines in even columns, and the drain electrode thereof is connected to the common electrode lines in even rows. The gate electrode of the second input TFT is connected to the touch scanning lines in even rows, the source electrode thereof is connected to the touch sensing lines in odd columns, and the drain electrode thereof is connected to the common electrode lines in odd rows.

A first input end of the two-way switch is connected to the touch sensing module, a second input end thereof is connected to the common electrode signal compensating module, and an output end thereof is connected to the touch sensing line. The two-way switch is configured to, when the scanning signal is applied to the touch scanning line in odd rows, enable the touch sensing module to be in electrical connection with the touch sensing lines in odd columns and enable the common electrode signal compensating module to be in electrical connection with the touch sensing lines in even columns, and when the scanning signal is applied to the touch scanning lines in even rows, enable the touch sensing module to be in electrical connection with the touch sensing lines in even columns, and enable the common electrode signal compensating module to be in electrical connection with the touch sensing lines in odd columns.

The touch sensing module is configured to, when the touch sensing module is in electrical connection with touch sensing lines through the two-way switch, receive the touch sensing signal from the touch sensing lines, determine whether the touch operation exists or not in accordance with the presence or absence of the change of the touch sensing signal, and when the touch operation exists, detect the change of the touch sensing signal, so as to obtain the touch position information.

The common electrode signal compensating module is configured to, when the common electrode signal compensating module is in electrical connection with touch sensing lines through the two-way switch, transmit a common electrode voltage compensating signal to the common electrode line, which is connected to the common electrode signal compensating module via the input TFT, through the touch sensing lines, so as to compensate the change of the common electrode voltage signal on the common electrode line.

To be specific, the capacitive built-in touch screen further includes the touch sensing module, the common electrode signal compensating module, at least one input TFT, and at least one two-way switch.

The input TFT includes the first input TFT and the second input TFT. The gate electrode of the first input TFT is connected to the touch scanning lines in odd rows, the source electrode thereof is connected to the touch sensing lines in odd columns, and the drain electrode thereof is connected to the common electrode lines in even rows. The gate electrode of the second input TFT is connected to the touch scanning lines in even rows, the source electrode thereof is connected to the touch sensing lines in even columns, and the drain electrode thereof is connected to the common electrode lines in odd rows.

A first input end of the two-way switch is connected to the touch sensing module, a second input end thereof is connected to the common electrode signal compensating module, and an output end thereof is connected to the touch sensing line. The two-way switch is configured to, when the touch scanning lines in odd rows are scanned, enable the touch sensing module to be in electrical connection with the touch sensing lines in even columns and enable the common electrode signal compensating module to be in electrical connection with the touch sensing lines in odd columns, and when the touch scanning lines in even rows are scanned, enable the touch sensing module to be in electrical connection with the touch sensing lines in odd columns, and enable the common electrode signal compensating module to be in electrical connection with the touch sensing lines in even columns.

The touch sensing module is configured to, when the touch sensing module is in electrical connection with touch sensing lines through the two-way switch, receive the touch sensing signal from the touch sensing lines, determine whether the touch operation exists or not in accordance with the presence or absence of the change of the touch sensing signal, and when the touch operation exists, detect the change of the touch sensing signal, so as to obtain the touch position information.

The common electrode signal compensating module is configured to, when the common electrode signal compensating module is in electrical connection with touch sensing lines through the two-way switch, transmit a common electrode voltage compensating signal to the common electrode line, which is connected to the common electrode signal compensating module via the input TFT, through the touch sensing lines, so as to compensate the change of the common electrode voltage signal on the common electrode line.

Figure 3:
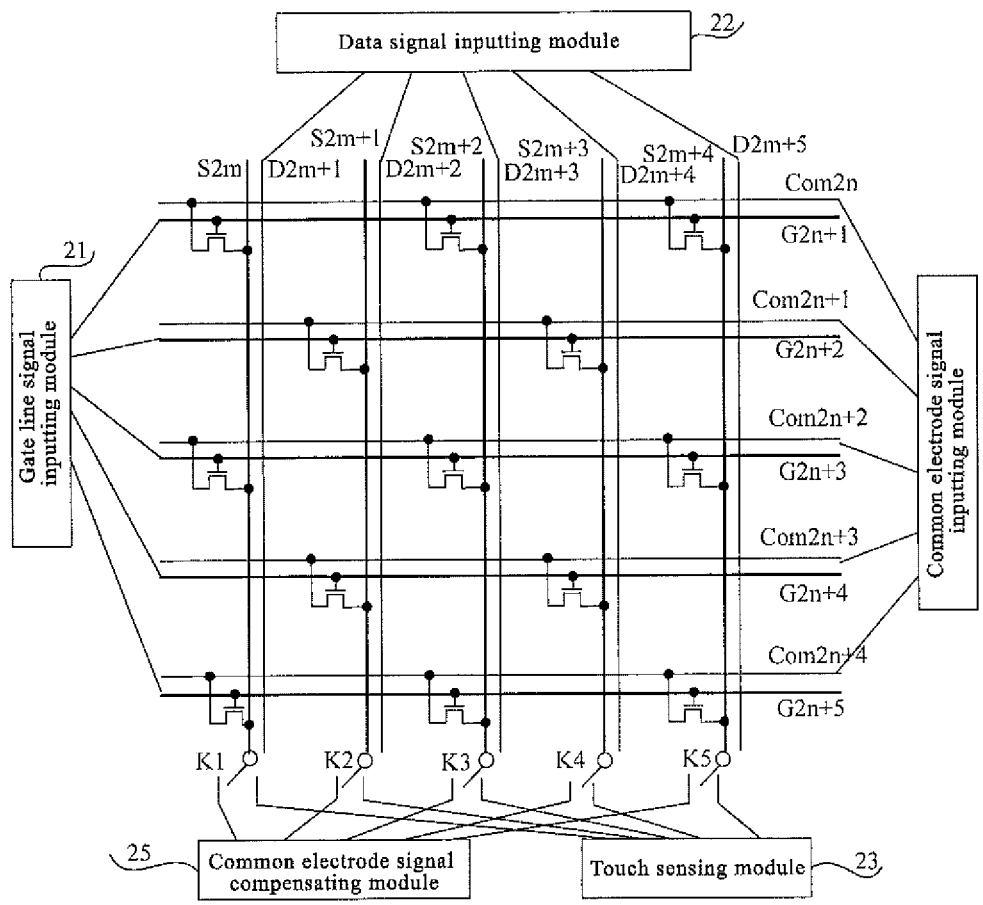
FIG. 3 is a schematic view showing a structure of the array substrate of the capacitive built-in touch screen according to another embodiment of the present disclosure.

FIG. 3 is a schematic view showing a structure of the array substrate of the capacitive built-in touch screen according to another embodiment of the present disclosure. The capacitive built-in touch screen according to an embodiment of the present disclosure includes the array substrate and the color film substrate (not shown in FIG. 3) arranged oppositely to form a cell. On the array substrate is provided with a plurality of gate lines, a plurality of data lines, a plurality of pixel electrodes, a plurality of TFTs (not shown in FIG. 3), and a plurality of pixel units (not shown in FIG. 3) defined by two adjacent gate lines and two adjacent data lines. The gate electrode of the TFT is connected to the gate line, the source electrode thereof is connected to the data line, and the drain electrode thereof is connected to the pixel electrode (not shown in FIG. 3).

The plurality of gate lines are set as the touch scanning lines, which include a touch scanning line $G2n+1$ in the $(2n+1)^{th}$ row, a touch scanning line $G2n+2$ in the $(2n+2)^{th}$ row, a touch scanning line $G2n+3$ in the $(2n+3)^{th}$ row, a touch scanning line $G2n+4$ in the $(2n+4)^{th}$ row, and a touch scanning line $G2n+5$ in the $(2n+5)^{th}$ row.

The plurality of data lines includes a data line $D2m+1$ in the $(2m+1)^{th}$ column, a data line $D2m+2$ in the $(2m+2)^{th}$ column, a data line $D2m+3$ in the $(2m+3)^{th}$ column, a data line $D2m+4$ in the $(2m+4)^{th}$ column, and a data line $D2m+5$ in the $(2m+5)^{th}$ column. m and n are both positive integers.

The capacitive built-in touch screen further includes at least one touch sensing line arranged on the array substrate and between adjacent columns of the pixel units.

The at least one touch sensing line includes a touch sensing line $S2m$ in the $(2m)^{th}$ column, a touch sensing line $S2m+1$ in the $(2m+1)^{th}$ column, a touch sensing line $S2m+2$ in the $(2m+2)^{th}$ column, a touch sensing line $S2m+3$ in the $(2m+3)^{th}$ column, and a touch sensing line $S2m+4$ in the $(2m+4)^{th}$ column.

The touch scanning line intersects the touch sensing line in different planes. The touch sensing line is configured to, when the scanning signals are applied to the touch scanning line, couple the gate scanning signals through the touch sensing capacitor so as to obtain and output the touch sensing signal.

A plurality of common electrode lines are further arranged on the array substrate and between adjacent rows of the pixel units.

The plurality of common electrode lines include a common electrode line $Com2n$ in the $(2n)^{th}$ row, a common electrode line $Com2n+1$ in the $(2n+1)^{th}$ row, a common electrode line $Com2n+2$ in the $(2n+2)^{th}$ row, a common electrode line $Com2n+3$ in the $(2n+3)^{th}$ row, and a common electrode line $Com2n+4$ in the $(2n+4)^{th}$ row.

The capacitive built-in touch screen further includes a gate line signal inputting module 21 connected to the touch scanning line $G2n+1$ in the $(2n+1)^{th}$ row, the touch scanning line $G2n+2$ in the $(2n+2)^{th}$ row, the touch scanning line $G2n+3$ in the $(2n+3)^{th}$ row, the touch scanning line $G2n+4$ in the $(2n+4)^{th}$ row and the touch scanning line $G2n+5$ in the $(2n+5)^{th}$ row, respectively, and configured to input the scanning signals to the touch scanning line $G2n+1$ in the $(2n+1)^{th}$ row, the touch scanning line $G2n+2$ in the $(2n+2)^{th}$ row, the touch scanning line $G2n+3$ in the $(2n+3)^{th}$ row, the touch scanning line $G2n+4$ in the $(2n+4)^{th}$ row and the touch scanning line $G2n+5$ in the $(2n+5)^{th}$ row in turn.

The capacitive built-in touch screen further includes a data signal inputting module 22 connected to the data line $D2m+1$ in the $(2m+1)^{th}$ column, the data line $D2m+2$ in the $(2m+2)^{th}$ column, the data line $D2m+3$ in the $(2m+3)^{th}$ column, the data line $D2m+4$ in the $(2m+4)^{th}$ column and the data line $D2m+5$ in the $(2m+5)^{th}$ column, respectively, and configured to input the data signals to the data line $D2m+1$ in the $(2m+1)^{th}$ column, the data line $D2m+2$ in the $(2m+2)^{th}$ column, the data line $D2m+3$ in the $(2m+3)^{th}$ column, the data line $D2m+4$ in the $(2m+4)^{th}$ column and the data line $D2m+5$ in the $(2m+5)^{th}$ column.

The capacitive built-in touch screen further includes a plurality of input TFTs. The input TFTs include a first input TFT and a second input TFT. The gate electrode of the first input TFT is connected to the touch scanning lines in odd rows, the source electrode thereof is connected to the touch sensing lines in even columns, and the drain electrode thereof is connected to the common electrode lines in even rows. The gate electrode of the second input TFT is connected to the touch scanning lines in even rows, the source electrode thereof is connected to the touch sensing lines in odd columns, and the drain electrode thereof is connected to the common electrode lines in odd rows.

The capacitive built-in touch screen further includes a plurality of two-way switches, the touch sensing modules 23, the common electrode signal inputting modules 24, and the common electrode signal compensating modules 25.

The common electrode signal inputting module 24 is configured to input the common electrode voltage signals to the common electrode line Com2n in the $(2n)^{th}$ row, the common electrode line Com2n+1 in the $(2n+1)^{th}$ row, the common electrode line Com2n+2 in the $(2n+2)^{th}$ row, the common electrode line Com2n+3 in the $(2n+3)^{th}$ row, and the common electrode line Com2n+4 in the $(2n+4)^{th}$ row.

The plurality of two-way switches include a first two-way switch K1, a second two-way switch K2, a third two-way switch K3, a fourth two-way switch K4 and a fifth two-way switch K5. A first input end of the first two-way switch K1 is connected to the touch sensing module 23, a second input end thereof is connected to the common electrode signal compensating module 25, and an output end thereof is connected to the touch sensing line S2m in the $(2m)^{th}$ column. A first input end of the second two-way switch K2 is connected to the touch sensing module 23, a second input end thereof is connected to the common electrode signal compensating module 25, and an output end thereof is connected to the touch sensing line S2m+1 in the $(2m+1)^{th}$ column. A first input end of the third two-way switch K3 is connected to the touch sensing module 23, a second input end thereof is connected to the common electrode signal compensating module 25, and an output end thereof is connected to the touch sensing line S2m+2 in the $(2m+2)^{th}$ column. A first input end of the fourth two-way switch K4 is connected to the touch sensing module 23, a second input end thereof is connected to the common electrode signal compensating module 25, and an output end thereof is connected to the touch sensing line S2m+3 in the $(2m+3)^{th}$ column. A first input end of the fifth two-way switch K5 is connected to the touch sensing module 23, a second input end thereof is connected to the common electrode signal compensating module 25, and an output end thereof is connected to the touch sensing line S2m+4 in the $(2m+4)^{th}$ column.

When the scanning signal is applied to the touch scanning line G2n+1 in the $(2n+1)^{th}$ row, the data signal is inputted, the touch sensing module 23 is in electrical connection with S2m+1 through K2, the touch sensing module 23 is in electrical connection with S2m+3 through K4, and S2m+1 and S2m+3 sense the scanning signal. If the touch operation exists at this time, the touch sensing signals outputted by S2m+1 and S2m+3 are changed so as to determine that the touch operation is exist. The common electrode signal compensating module 25 is in electrical connection with S2m through K1, the common electrode signal compensating module 25 is in electrical connection with S2m+2 through K3, and the common electrode signal compensating module 25 is in electrical connection with S2m+4 through K5. The common electrode signal compensating module 25 transmits the common electrode voltage compensating signal to Com2n through S2m and the first input TFT connected to S2m, transmits the common electrode voltage compensating signal to Com2n through S2m+2 and the first input TFT connected to S2m+2, and transmits the common electrode voltage compensating signal to Com2n through S2m+4 and the first input TFT connected S2m+4.

When the scanning signal is applied to the touch scanning line G2n+2 in the $(2n+2)^{th}$ row, the data signal is inputted, the touch sensing module 23 is in electrical connection with S2m through K1, the touch sensing module 23 is in electrical connection with S2m+2 through K3, the touch sensing module 23 is in electrical connection with S2m+4 through K5, and S2m, S2m+2 and S2m+4 sense the scanning signal. If the touch operation exists at this time, the touch sensing signals outputted by S2m, S2m+2 and S2m+4 are changed so as to determine that the touch operation exists. The common electrode signal compensating module 25 is in electrical connection with S2m+1 through K2, and the common electrode signal compensating module 25 is in electrical connection with S2m+3 through K4. The common electrode signal compensating module 25 transmits the common electrode voltage compensating signal to Com2n+1 through S2m+1 and the second input TFT connected to S2m+1, and transmits the common electrode voltage compensating signal to Com2n+1 through S2m+3 and the second input TFT connected to S2m+3.

When the scanning signal is applied to the touch scanning line G2n+3 in the $(2n+3)^{th}$ row, the data signal is inputted, the touch sensing module 23 is in electrical connection with S2m+1 through K2, the touch sensing module 23 is in electrical connection with S2m+3 through K4, and S2m+1 and S2m+3 sense the scanning signal. If the touch operation exists at this time, the touch sensing signals outputted by S2m+1 and S2m+3 are changed so as to determine that the touch operation exists. The common electrode signal compensating module 25 is in electrical connection with S2m through K1, the common electrode signal compensating module 25 is in electrical connection with S2m+2 through K3, and the common electrode signal compensating module 25 is in electrical connection with S2m+4 through K5. The common electrode signal compensating module 25 transmits the common electrode voltage compensating signal to Com2n+2 through S2m and the first input TFT connected to S2m, transmits the common electrode voltage compensating signal to Com2n+2 through S2m+2 and the first input TFT connected S2m+2, and transmits the common electrode voltage compensating signal to Com2n+2 through S2m+4 and the first input TFT connected S2m+4.

When the scanning signal is applied to the touch scanning line G2n+4 in the $(2n+4)^{th}$ row, the data signal is inputted, the touch sensing module 23 is in electrical connection with S2m through K1, the touch sensing module 23 is in electrical connection with S2m+2 through K3, the touch sensing module 23 is in electrical connection with S2m+4 through K5, and S2m, S2m+2 and S2m+4 sense the scanning signal. If the touch operation exists at this time, the touch sensing signals outputted by S2m, S2m+2 and S2m+4 are changed so as to determine that the touch operation exists. The common electrode signal compensating module 25 is in electrical connection with S2m+1 through K2, and the common electrode signal compensating module 25 is in electrical connection with S2m+3 through K4. The common electrode signal compensating module 25 transmits the common electrode voltage compensating signal to Com2n+3 through S2m+1 and the second input TFT connected to S2m+1, and transmits the common electrode voltage compensating signal to Com2n+3 through S2m+3 and the second input TFT connected to S2m+3.

When the scanning signal is applied to the touch scanning line G2n+5 in the $(2n+5)^{th}$ row, the data signal is inputted, the touch sensing module 23 is in electrical connection with S2m+1 through K2, the touch sensing module 23 is in electrical connection with S2m+3 through K4, and S2m+1 and S2m+3 sense the scanning signal. If the touch operation exists at this time, the touch sensing signals outputted by S2m+1 and S2m+3 are changed so as to determine that the touch operation exists. The common electrode signal compensating module 25 is in electrical connection with S2m through K1, the common electrode signal compensating module 25 is in electrical connection with S2m+2 through K3, and the common electrode signal compensating module 25 is in electrical connection with S2m+4 through K5. The common electrode signal compensating module 25 transmits the common electrode voltage compensating signal to Com2n+4 through S2m and the first input TFT connected to S2m, transmits the common electrode voltage compensating signal to Com2n+2 through S2m+2 and the first input TFT connected S2m+2, and transmits the common electrode voltage compensating signal to Com2n+5 through S2m+4 and the first input TFT connected to S2m+4.

The present disclosure further provides a touch positioning method for use in the above-mentioned capacitive built-in touch screen, including:

when a scanning signal is applied to a touch scanning line, detecting a touch sensing signal coupled by a touch sensing line through a touch sensing capacitor, and determining touch position information in accordance with a change of the touch sensing signal and the a position of the touch sensing capacitor.

According to the touch positioning method for use in the capacitive built-in touch screen of the present disclosure, at least one gate line on the array substrate is used as the touch scanning line, and at least one touch sensing line intersecting the touch scanning line in different planes are arranged on the array substrate. When the gate lines are scanned (i.e., when the scanning signal is applied to the touch scanning lines), a data signal is inputted via a data line, and meanwhile the gate scanning signals are coupled by the touch sensing line through the touch sensing capacitor, so as to obtain and output the touch sensing signal. As a result, it is able to achieve the display function and the touch function within an identical period of time while improving an aperture ratio of the array substrate, without affecting a charge time for the pixels or reducing a display refresh rate. In addition, it is able to stabilize the voltage of a common electrode network by inputting the common electrode voltage compensating signal while achieving the touch function, and improve its stability and uniformity, thereby to improve the display quality.

The present disclosure further provides a display device including the above-mentioned capacitive built-in touch screen.

The above are merely the preferred embodiments of the present disclosure. It should be appreciated that, a person skilled in the art may make further modifications and improvements without departing from the principle of the present disclosure, and these modifications and improvements shall also be considered as the scope of the present disclosure.

What is claimed is:

1. A capacitive built-in touch screen, comprising an array substrate and a color film substrate arranged oppositely to form a cell, a plurality of gate lines, a plurality of data lines, and a plurality of pixel units defined by two adjacent gate lines and two adjacent data lines being arranged on the array substrate, wherein at least one of the gate lines is set as a touch scanning line, the capacitive built-in touch screen further comprises at least one touch sensing line arranged on the array substrate, the touch scanning line intersects the touch sensing line in different planes, the touch sensing line is configured to, when a scanning signal is applied to the touch scanning line, couple the scanning signal through a touch sensing capacitor to obtain and output a touch sensing signal, and the touch sensing capacitor is arranged at an intersection of the touch scanning line and the touch sensing lines on different planes, wherein the array substrate is further provided with a plurality of common electrode lines, which are arranged between adjacent rows of the pixel units, the capacitive built-in touch screen further comprises a common electrode signal inputting module connected to the plurality of common electrode lines and configured to input common electrode voltage signals to the plurality of common electrode lines, the capacitive built-in touch screen further comprises a touch sensing module, a common electrode signal compensating module, at least one input TFT and at least one two-way switch, a gate electrode of the input TFT is connected to a row of the touch scanning line, a source electrode of the input TFT is connected to a column of the touch sensing line, and a drain electrode of the input TFT is connected to a row of the common electrode line, the input TFT comprises a input first TFT and a second input TFT, a gate electrode of the first input TFT and a gate electrode of the second input TFT are connected to the touch scanning lines in different rows, a source electrode of the first input TFT and a source electrode of the second input TFT are connected to the touch sensing lines in different columns, a drain electrode of the first input TFT and a drain electrode of the second input TFT are connected to the common electrode lines in different rows, a first input end of the two-way switch is connected to the touch sensing module, a second input end of the two-way switch is connected to the common electrode signal compensating module, and an output end of the two-way switch is connected to the touch sensing line, so that the two-way switch is configured to, when a scanning signal is applied to the row of touch scanning line connected to the gate electrode of the first input TFT, enable the touch sensing module to be in electrical connection with the column of the touch sensing line not connected to the source electrode of the first input TFT, and enable the common electrode signal compensating module to be in electrical connection with the column of the touch sensing line connected to the source electrode of the first input TFT, the two-way switch is further configured to, when a scanning signal is applied to the row of the touch scanning line connected to the pate electrode of the second input TFT, enable the touch sensing module to be in electrical connection with the column of the touch sensing lines not connected to the source electrode of the second input TFT, and enable the common electrode signal compensating module to be in electrical connection with the column of the touch sensing lines connected to the source electrode of the second input TFT, the touch sensing module is configured to, when the touch sensing module is in electrical connection with the touch sensing line through the two-way switch, receive the touch sensing signal from the touch sensing line, determine whether the touch operation exists or not in accordance with the presence or absence of the change of the touch sensing signal, and when the touch operation exists, detect the change of touch sensing signal so as to obtain the touch position information, and the common electrode signal compensating module is configured to, when the common electrode signal compensating module is in electrical connection with the touch sensing line through the two-way switch, transmit a common electrode voltage compensating signal to the common electrode line, which is connected to the common electrode signal compensating module via the input TFT, through the touch sensing line, so as to compensate a change of the common electrode voltage signal on the common electrode line.

2. The capacitive built-in touch screen according to claim 1, wherein a transparent metal layer on the color film substrate corresponding to a position where the touch sensing capacitor is located is provided with an opening.

3. The capacitive built-in touch screen according to claim 2, wherein the touch sensing line is arranged between adjacent columns of the pixel units.

4. The capacitive built-in touch screen according to claim 3, further comprising a touch sensing module connected to the touch sensing line, and configured to receive the touch sensing signal from the touch sensing line, determine whether a touch operation exists or not in accordance with the presence or absence of a change of the touch sensing signal, and when the touch operation exists, detect the change of touch sensing signal so as to obtain touch position information.

5. The capacitive built-in touch screen according to claim 3,
wherein the array substrate is further provided with a plurality of common electrode lines, which are arranged between adjacent rows of the pixel units,
the capacitive built-in touch screen further comprises a common electrode signal inputting module connected to the plurality of common electrode lines and configured to input common electrode voltage signals to the plurality of common electrode lines,
the capacitive built-in touch screen further comprises a touch sensing module, a common electrode signal compensating module, at least one input TFT and at least one two-way switch,
a gate electrode of the input TFT is connected to a row of the touch scanning line, a source electrode of the input TFT is connected to a column of the touch sensing line, and a drain electrode of the input TFT is connected to a row of the common electrode line,
the input TFT comprises a input first TFT and a second input TFT,
a gate electrode of the first input TFT and a gate electrode of the second input TFT are connected to the touch scanning lines in different rows,
a source electrode of the first input TFT and a source electrode of the second input TFT are connected to the touch sensing lines in different columns,
a drain electrode of the first input TFT and a drain electrode of the second input TFT are connected to the common electrode lines in different rows,
a first input end of the two-way switch is connected to the touch sensing module, a second input end of the two-way switch is connected to the common electrode signal compensating module, and an output end of the two-way switch is connected to the touch sensing line, so that the two-way switch is configured to, when a scanning signal is applied to the row of touch scanning line connected to the gate electrode of the first input TFT, enable the touch sensing module to be in electrical connection with the column of the touch sensing lines not connected to the source electrode of the first input TFT, and enable the common electrode signal compensating module to be in electrical connection with the column of the touch sensing line connected to the source electrode of the first input TFT,
the two-way switch is further configured to, when a scanning signal is applied to the row of the touch scanning line connected to the gate electrode of the second input TFT, enable the touch sensing module to be in electrical connection with the column of the touch sensing lines not connected to the source electrode of the second input TFT, and enable the common electrode signal compensating module to be in electrical connection with the column of the touch sensing lines connected to the source electrode of the second input TFT,
the touch sensing module is configured to, when the touch sensing module is in electrical connection with the touch sensing line through the two-way switch, receive the touch sensing signal from the touch sensing line, determine whether the touch operation exists or not in accordance with the presence or absence of the change of the touch sensing signal, and when the touch operation exists, detect the change of touch sensing signal so as to obtain the touch position information, and
the common electrode signal compensating module is configured to, when the common electrode signal compensating module is in electrical connection with the touch sensing line through the two-way switch, transmit a common electrode voltage compensating signal to the common electrode line, which is connected to the common electrode signal compensating module via the input TFT, through the touch sensing line, so as to compensate a change of the common electrode voltage signal on the common electrode line.

6. The capacitive built-in touch screen according to claim 2, further comprising a touch sensing module connected to the touch sensing line, and configured to receive the touch sensing signal from the touch sensing line, determine whether a touch operation exists or not in accordance with the presence or absence of a change of the touch sensing signal, and when the touch operation exists, detect the change of touch sensing signal so as to obtain touch position information.

7. The capacitive built-in touch screen according to claim 2,
wherein the array substrate is further provided with a plurality of common electrode lines, which are arranged between adjacent rows of the pixel units,
the capacitive built-in touch screen further comprises a common electrode signal inputting module connected to the plurality of common electrode lines and configured to input common electrode voltage signals to the plurality of common electrode lines,
the capacitive built-in touch screen further comprises a touch sensing module, a common electrode signal compensating module, at least one input TFT and at least one two-way switch,
a gate electrode of the input TFT is connected to a row of the touch scanning line, a source electrode of the input TFT is connected to a column of the touch sensing line, and a drain electrode of the input TFT is connected to a row of the common electrode line, the input TFT comprises a input first TFT and a second input TFT, a gate electrode of the first input TFT and a gate electrode of the second input TFT are connected to the touch scanning lines in different rows, a source electrode of the first input TFT and a source electrode of the second input TFT are connected to the touch sensing lines in different columns, a drain electrode of the first input TFT and a drain electrode of the second input TFT are connected to the common electrode lines in different rows, a first input end of the two-way switch is connected to the touch sensing module, a second input end of the two-way switch is connected to the common electrode signal compensating module, and an output end of the two-way switch is connected to the touch sensing line, so that the two-way switch is configured to, when a scanning signal is applied to the row of touch scanning line connected to the gate electrode of the first input TFT, enable the touch sensing module to be in electrical connection with the column of the touch sensing lines not connected to the source electrode of the first input TFT, and enable the common electrode signal compensating module to be in electrical connection with the column of the touch sensing line connected to the source electrode of the first input TFT, the two-way switch is further configured to, when a scanning signal is applied to the row of the touch scanning line connected to the gate electrode of the second input TFT, enable the touch sensing module to be in electrical connection with the column of the touch sensing lines not connected to the source electrode of the second input TFT, and enable the common electrode signal compensating module to be in electrical connection with the column of the touch sensing lines connected to the source electrode of the second input TFT, the touch sensing module is configured to, when the touch sensing module is in electrical connection with the touch sensing line through the two-way switch, receive the touch sensing signal from the touch sensing line, determine whether the touch operation exists or not in accordance with the presence or absence of the change of the touch sensing signal, and when the touch operation exists, detect the change of touch sensing signal so as to obtain the touch position information, and the common electrode signal compensating module is configured to, when the common electrode signal compensating module is in electrical connection with the touch sensing line through the two-way switch, transmit a common electrode voltage compensating signal to the common electrode line, which is connected to the common electrode signal compensating module via the input TFT, through the touch sensing line, so as to compensate a change of the common electrode voltage signal on the common electrode line.

8. The capacitive built-in touch screen according to claim 1, further comprising a touch sensing module connected to the touch sensing line, and configured to receive the touch sensing signal from the touch sensing line, determine whether a touch operation exists or not in accordance with the presence or absence of a change of the touch sensing signal, and when the touch operation exists, detect the change of touch sensing signal so as to obtain touch position information.

9. The capacitive built-in touch screen according to claim 1, wherein the gate electrode of the first input TFT is connected to the touch scanning lines in odd rows, the source electrode of the first input TFT is connected to the touch sensing lines in even columns, and the drain electrode of the first input TFT is connected to the common electrode lines in even rows, the gate electrode of the second input TFT is connected to the touch scanning lines in even rows, the source electrode of the second input TFT is connected to the touch sensing lines in odd columns, and the drain electrode thereof is connected to the common electrode lines in odd rows, and the two-way switch is configured to, when the scanning signal is applied to the touch scanning lines in odd rows, enable the touch sensing module to be in electrical connection with the touch sensing lines in odd columns and enable the common electrode signal compensating module to be in electrical connection with the touch sensing lines in even columns, and when the scanning signal is applied to the touch scanning lines in even rows, enable the touch sensing module to be in electrical connection with the touch sensing lines in even columns, and enable the common electrode signal compensating module to be in electrical connection with the touch sensing lines in odd columns.

10. The capacitive built-in touch screen according to claim 1, wherein the gate electrode of the first input TFT is connected to the touch scanning lines in odd rows, the source electrode of the first input TFT is connected to the touch sensing lines in odd columns, and the drain electrode of the first input TFT is connected to the common electrode lines in even rows, the gate electrode of the second input TFT is connected to the touch scanning lines in even rows, the source electrode of the second input TFT is connected to the touch sensing lines in even columns, and the drain electrode of the second input TFT is connected to the common electrode lines in odd rows, and the two-way switch is configured to, when the touch scanning lines in odd rows are scanned, enable the touch sensing module to be in electrical connection with the touch sensing lines in even columns, and enable the common electrode signal compensating module to be in electrical connection with the touch sensing lines in odd columns, and when the touch scanning lines in even rows are scanned, enable the touch sensing module to be in electrical connection with the touch sensing lines in odd columns, and enable the common electrode signal compensating module to be in electrical connection with the touch sensing lines in even columns.

11. A touch positioning method for use in the capacitive built-in touch screen according to claim 1, comprising:

when a scanning signal is applied to a touch scanning line, detecting a touch sensing signal coupled by a touch sensing line through a touch sensing capacitor, and determining touch position information in accordance with a change of the touch sensing signal and a position of the touch sensing capacitor.

12. The touch positioning method according to claim 11, wherein at least one gate line on an array substrate is used as the touch scanning line, and at least one touch sensing line intersecting the touch scanning line in different planes are arranged on the array substrate.

13. The touch positioning method according to claim 11, wherein a transparent metal layer on a color film substrate corresponding to a position where the touch sensing capacitor is located is provided with an opening.

14. The touch positioning method according to claim 13, wherein the touch sensing line is arranged between adjacent columns of the pixel units.

15. The touch positioning method according to claim 11, further comprising receiving the touch sensing signal from the touch sensing line, determining whether a touch operation exists or not in accordance with the presence or absence of a change of the touch sensing signal, and when the touch operation exists, detecting the change of touch sensing signal so as to obtain touch position information.

16. The touch positioning method according to claim 11, wherein the array substrate is further provided with a plurality of common electrode lines, which are arranged between adjacent rows of the pixel units, and the method further comprises inputting common electrode voltage signals into the plurality of common electrode lines.

17. A display device comprising the capacitive built-in touch screen according to claim 1.

* * * * *